US012791308B2

(12) United States Patent
Liu et al.

(10) Patent No.: US 12,791,308 B2
(45) Date of Patent: Nov. 10, 2026

(54) METHOD AND SYSTEM OF MEASURING STRUCTURAL OVERLAY BASED ON SCATTERING X-RAY

(71) Applicant: INDUSTRIAL TECHNOLOGY RESEARCH INSTITUTE, Hsinchu (TW)

(72) Inventors: Chun-Yu Liu, Taipei City (TW); Wei-En Fu, Taoyuan City (TW); Wen-Li Wu, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 207 days.

(21) Appl. No.: 18/651,559

(22) Filed: Apr. 30, 2024

(65) Prior Publication Data

US 2026/0118116 A1 Apr. 30, 2026

(51) Int. Cl.
*G01B 15/00* (2006.01)

(52) U.S. Cl.
CPC .................................... *G01B 15/00* (2013.01)

(58) Field of Classification Search
None
See application file for complete search history.

(56) References Cited

U.S. PATENT DOCUMENTS 9,297,772 B2 3/2016 Fu et al.
11,287,253 B2 3/2022 Liu et al.
11,698,251 B2 7/2023 Shchegrov et al.
2007/0224518 A1* 9/2007 Yokhin ............... G03F 7/70633 430/5
2015/0110249 A1* 4/2015 Bakeman ............. G01N 23/207 378/87
2015/0117610 A1* 4/2015 Veldman ............. G03F 7/70633 378/86
2016/0223476 A1* 8/2016 Quintanilha ........ G03F 7/70591
2016/0282282 A1* 9/2016 Quintanilha ....... G01N 21/8806
2016/0320319 A1* 11/2016 Hench ................. G03F 7/70633
2016/0341674 A1 11/2016 Wu et al.
2021/0207956 A1* 7/2021 Shchegrov ............. G01B 15/00
2021/0262950 A1* 8/2021 Blasenheim ........ G03F 7/70625
(Continued)

FOREIGN PATENT DOCUMENTS

CN 111542783 A 8/2020
EP 2 863 213 A1 4/2015
TW 201839388 11/2018
(Continued)

OTHER PUBLICATIONS

TW Office Action dated Sep. 16, 2024 in application 113116108.
Huang et al., "Scatterometry-Based Overlay Metrology" 2003.

*Primary Examiner* — Marcus H Taningco
(74) *Attorney, Agent, or Firm* — Maschoff Brennan

(57) ABSTRACT

A method for measuring structural overlay using X-ray scattering includes emitting incident light from an X-ray source toward a stacked structure. An optical detection component detects scattered light from the first and second layers in contact. A computing device measures the light intensity of the scattered light based on a target material light intensity distribution diagram, calculates differences between positive and negative order light intensities, and determines the presence of an overlay between the layers.

18 Claims, 8 Drawing Sheets

(56) References Cited

U.S. PATENT DOCUMENTS

2023/0359129 A1 * 11/2023 Madsen .............. G03F 7/70633

FOREIGN PATENT DOCUMENTS

| | | | |
|---|---|---|---|
| TW | 202117309 | A | 5/2021 |
| TW | 202124941 | A | 7/2021 |
| TW | I753490 | B | 1/2022 |
| TW | 202240152 | A | 10/2022 |

* cited by examiner

METHOD AND SYSTEM OF MEASURING STRUCTURAL OVERLAY BASED ON SCATTERING X-RAY

BACKGROUND

1. Technical Field

This disclosure relates to a method and system of measuring a structural overlay using an X-ray scattering.

2. Related Art

In advanced semiconductor manufacturing, as dimensions shrink and three-dimensional structure become more complex, measuring critical parameters such as film thickness, critical dimension (CD), and overlay for transistors becomes increasingly challenging. To construct three-dimensional structures such as Gate-All-Around (GAA), Forksheet, and Complementary FET (CFET) structures, the process requires repeated photolithography and etching, and the alignment of the patterns etched on the wafer is called "overlay". If the upper and lower structures are aligned and there is no overlay, the overlay parameter (f) is 0. Introducing cutting-edge materials like germanium (Ge) and bismuth (Bi) into advanced processes makes measuring structural overlay even more difficult as dimensions decrease. For example, when the 3D structure was first introduced into the 14 nm process, the structural overlay measurement was about 6 nm. As the process advanced to 7 nm, the measurement was about 3 nm. In the advanced 2 nm process, atomic level overlay (<1 nm) is required.

SUMMARY

According to an embodiment of this disclosure, a method for measuring structural overlay using X-ray scattering includes: emitting an incident light from an X-ray light source toward a stacked structure with a first layer and a second layer in contact; detecting scattered light from the first layer and the second layer using an optical detection component; and measuring, using a computing device, measuring light intensity of the scattered light according to a target material light intensity distribution diagram, calculating a difference between a plurality of positive and negative order light intensities in the scattered light according to the plurality of positive and negative order light intensities contained in the scattered light, and determining presence of an overlay between the first layer and the second layer based on an overlay parameter, wherein the first layer and the second layer is determined to be aligned with each other when the computing device determines that there is no overlay, the first layer and the second layer is determined to be not aligned with each other when the computing device determines that the overlay exists, and the target material light intensity distribution diagram includes a plurality of positive and negative order scattered light intensities of a target material, and the light intensity of the scattered light detected by the optical detection component decreases as attenuation of the scattered light increases.

According to an embodiment of this disclosure, a system for measuring structural overlay using X-ray scattering includes an X-ray light source, an optical detection component and a computing device. The X-ray light source is configured to emit an incident light toward a stacked structure with a first layer and a second layer in contact. The optical detection component is configured to detect scattered light from the first layer and the second layer. The computing device is connected to the optical detection component, and configured to measure light intensity of the scattered light according to a target material light intensity distribution diagram, calculating a difference between a plurality of positive and negative order light intensities in the scattered light according to the plurality of positive and negative order light intensities contained in the scattered light; and determining the presence of an overlay between the first layer and the second layer based on an overlay parameter, wherein the first layer and the second layer is determined to be aligned with each other when the computing device determines that there is no overlay, the first layer and the second layer is determined to be not aligned with each other when the computing device determines that the overlay exists, and the target material light intensity distribution diagram comprises a plurality of positive and negative order scattered light intensities of a target material, and the light intensity of the scattered light detected by the optical detection component decreases as attenuation of the scattered light increases.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The present disclosure proposes an overlay measurement system and method based on X-ray scattering technology, which uses the difference in intensity of positive and negative orders X-ray scattering signals and scattering vectors to obtain overlay-related information. The X-ray scattering technology may be based on Transmission Small-Angle X-ray Scattering (tSAXS) or Reflection Small-Angle X-ray Scattering (RSAXS).

Figure 1:
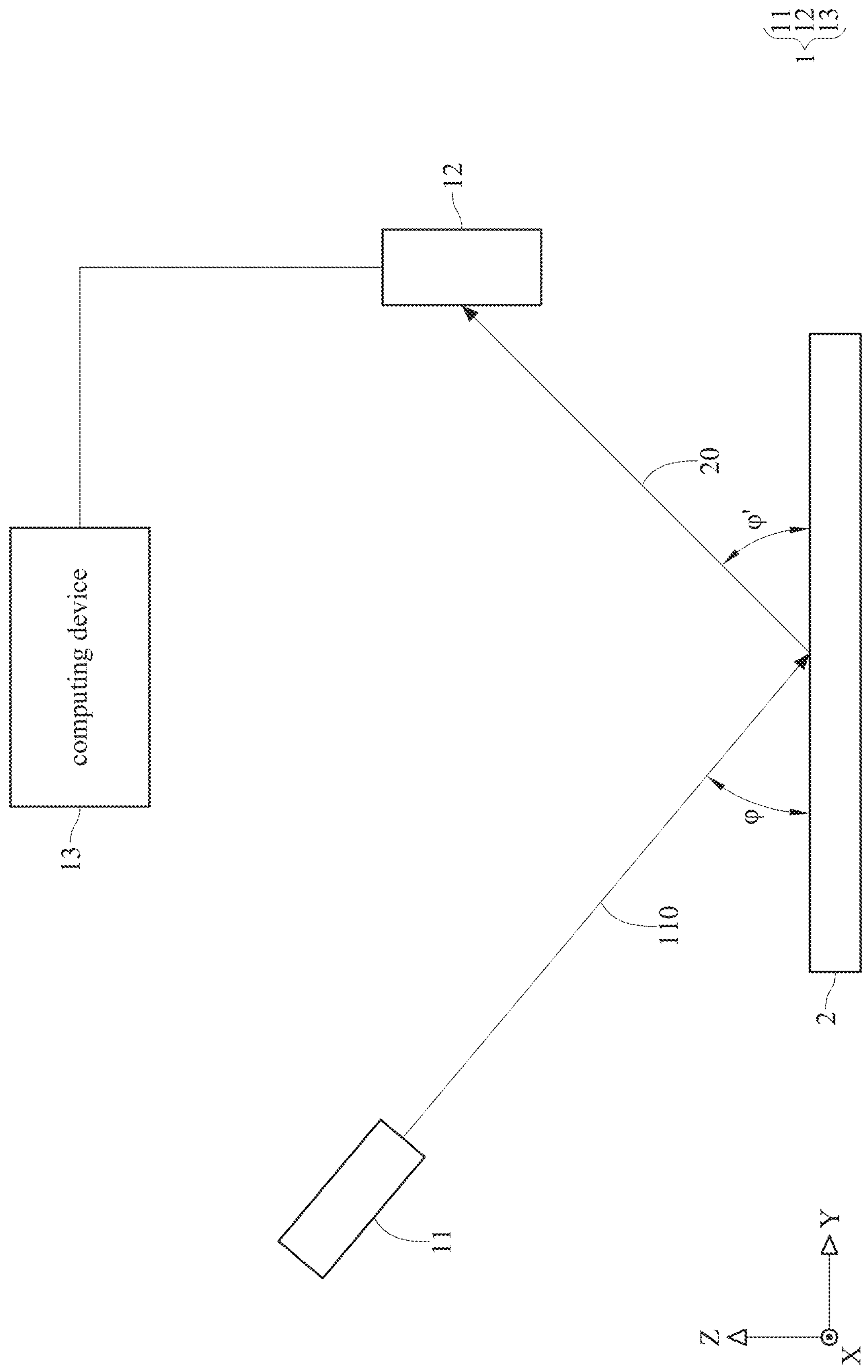
FIG. 1 is a block diagram of an overlay measurement system according to an embodiment of the present disclosure.

Refer to FIG. 1 which illustrates a block diagram of an overlay measurement system in one embodiment of this disclosure. The overlay measurement system 1 includes an X-ray light source 11, an optical detection component 12 and a computing device 13. The X-ray light source 11 is configured to emit an incident light 110 toward a stacked structure 2 with first and second layers in contact. The optical detection component detects scattered light from these layers. The computing device measures the light intensity of the scattered light based on a target material light intensity distribution diagram, calculates differences between positive and negative order light intensities, and determines the presence of an overlay based on these measurements. As refer to FIG. 1, there is an incident angle φ between the incident light 110 and the stacked structure 2, wherein the stacked structure 2 includes a first layer and a second layer. The optical detection component 12 is configured to measure the intensity of scattered light 20 in response to the incident light 110, wherein there is a reflection angle φ' between the scattered light 20 and the stacked structure 2. The scattered light 20 include +Nth order scattered light and −Nth order scattered light, wherein N is a natural number. The computing device 13 is connected to the optical detection component 12 and is configured to obtain an Nth scattering signal intensity difference between the +Nth order scattered light and the −Nth order scattered light according to the signal measured by the optical detection component 12, and obtain an Nth scattering vector of the +Nth order scattered light or the −Nth order scattered light. The computing device 13 then determines an overlay between the first layer and the second layer according to at least a first relational expression, wherein the first relational expression indicates that the Nth scattering signal intensity difference is related to the trigonometric function value of the product of the Nth scattering vector and an overlay value.

In the present embodiment, the X-ray light source 11 may be a coherent light source with a wavelength range of about 0.01 nm to 10 nm, such as an X-ray laser. In addition, in advanced semiconductor process (such as lithography process), extreme-ultraviolet light source with wavelength of 13.5 nm is often used. Therefore, it should be understood that the "X-ray" described in the present disclosure is not limited to a specific wavelength value, instead, the wavelength or bandwidth of the light source may be selected and adjusted according to the critical dimensions in the manufacturing process. The optical detection component 12 may be a two-dimensional sensor, such as a charge-coupled device (CCD). The optical detection component 12 may be configured to receive the scattered light 20 generated by the incident light 110 being scattered by the stacked structure 2. Therefore, the optical detection component 12 may detect different orders of scattering signals at different positions on its sensing plane.

The arrangement of the X-ray light source 11, the optical detection component 12 and the stacked structure 2 can be designed according to the scattering technology used. FIG. 1 schematically presents the measurement architecture of reflective X-ray scattering, wherein the X-ray light source 11 and the optical detection component 12 may be disposed on the same side of the stacked structure 2, and the optical detection component 12 is configured to measure the scattered light 20 formed by the incident light 110 being reflected by the stacked structure 2. In another embodiment, the X-ray light source 11, the optical detection component 12 and the stacked structure 2 may be configured as a measurement architecture of transmission X-ray scattering, wherein the X-ray light source 11 and the optical detection component 12 may be disposed on opposite sides of the stacked structure 2, and the optical detection component 12 is configured to measure the scattered light 20 formed by the incident light 110 transmitting the stacked structure 2. In particular, the incident light 110 may enter the surface of the stacked structure at a very shallow angle (typically less than 1 degree) and be scattered along a direction different from the incident direction.

In the present embodiment, the computing device 13 is connected to the optical detection component 12 through wire or wireless connection to receive the measurement data from the optical detection component 12. Specifically, the computing device 13 may include one or more processing/control units with data receiving, recording, computing, storage and output functions. The processing/control unit is, for example, a microcontroller, a central processing unit, a graphics processing unit, a programmable logic controller, or any combination of the above. In addition, the computing device 13 used to obtain the measurement data of the optical detection component 12 and perform data processing in the present disclosure may be the same device as or a different device from the control device (such as computer equipment and laser driver) that controls the X-ray light source 11, and the present disclosure is not limited thereof.

Figure 2:
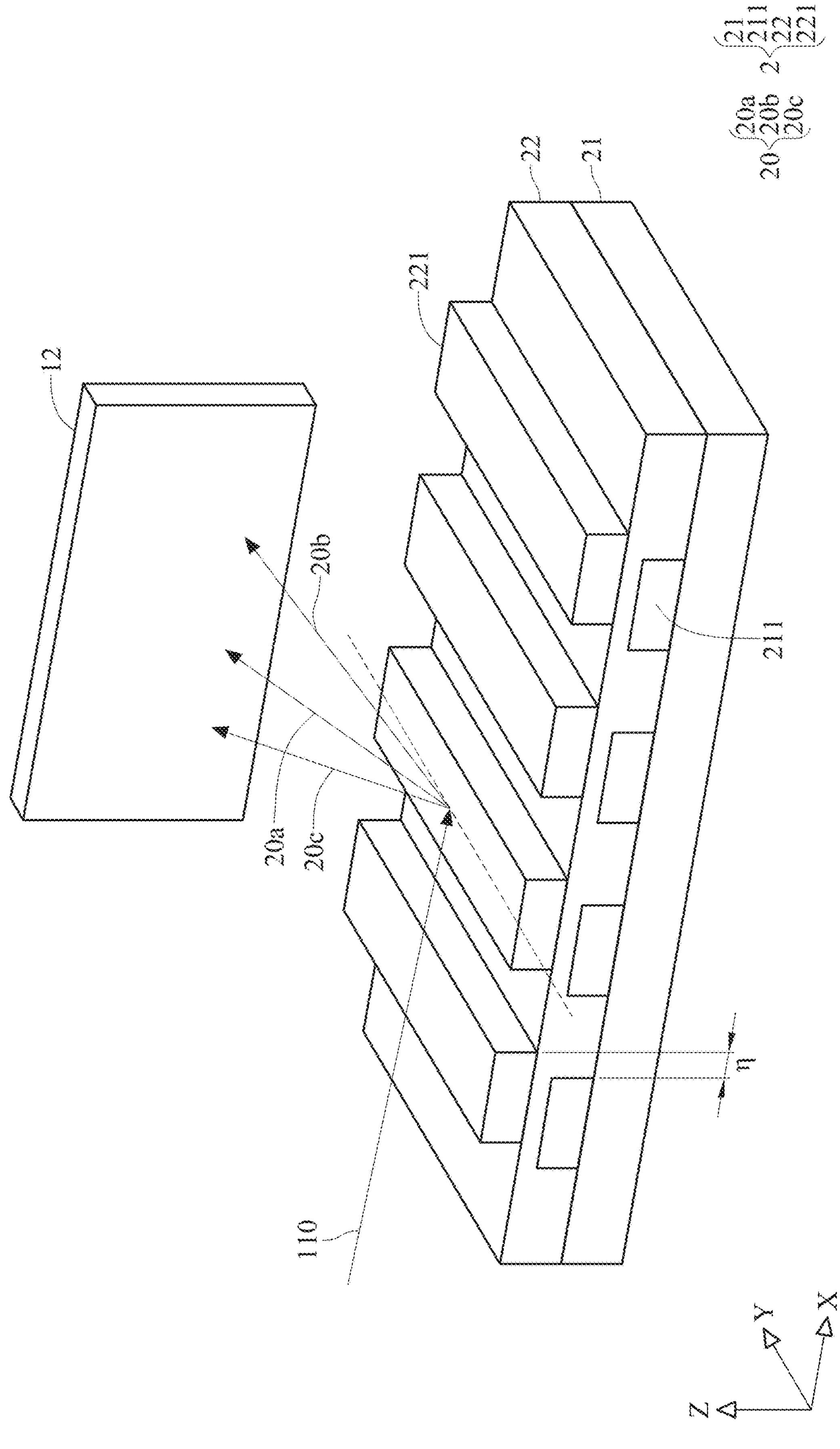
FIG. 2 is a schematic diagram of an overlay measurement system according to an embodiment of the present disclosure, in which incident light is scattered by a stacked structure to generate multi-order scattered light.

Please refer to FIG. 2 along with FIG. 1, FIG. 2 is a schematic diagram of an overlay measurement system according to an embodiment of the present disclosure, in which incident light is scattered by a stacked structure to generate multi-order scattered light. As shown in FIG. 2, the stacked structure 2 has a first layer 21 and a second layer 22 stacked along the Z direction. A plurality of first units 211 are periodically arranged along the X direction and extending in the Y direction on first layer 21. A plurality of second units 221 are periodically arranged along the X direction and extending in the Y direction on second layer 22. The first units 211 on the first layer 21 and the second units 221 on the second layer 22 have an overlay value η of relative misalignment in the X direction. Further, when the incident light 110 is incident on the surface of the stacked structure 2 along a direction having an included angle (incident angle φ) with the Y direction, the first units 211 on the first layer 21 and the second units 221 on the second layer 22 may generate multi-order scattered light 20*a*, 20*b*, 20*c*. The scattered light 20*a* may represent the 0th order scattered light, the scattered light 20*b* may represent the +1st order scattered light, and the scattered light 20*c* may represent the −1st order scattered light. It should be noted that more orders of scattered light can be generated between the first layer 21 and the second layer 22, which is not limited in the present disclosure. The optical detection component 12 may receive multi-order scattered light at different positions to measure the intensity distribution of the scattered light.

The present disclosure also proposes an overlay measurement method. In one embodiment, using FIG. 1 and FIG. 2 as an example to exemplify, the overlay measurement method includes: emitting the incident light 110 from the X-ray light source 11 toward the stacked structure 2 with the first layer 21 and the second layer 22 in contact; detecting the scattered light 20 from the first layer 21 and the second layer 22 using an optical detection component 12; and measuring, using the computing device 13, light intensity of the scattered light according to a target material light intensity distribution diagram, calculating a difference between intensities of a plurality of positive and negative order light 20*b*, 20*c* in the scattered light 20 according to the intensities of the plurality of positive and negative order light 20*b*, 20*c* contained in the scattered light 20; and determining the presence of an overlay between the first layer 21 and the second layer 22 based on an overlay parameter, wherein the first layer 21 and the second layer 22 is determined to be aligned with each other when the computing device 13 determines that there is no overlay, the first layer 21 and the second layer 22 is determined to be not aligned with each other when the computing device 13 determines that the overlay exists, and the target material light intensity distribution diagram includes intensities of the plurality of positive and negative order scattered light 20*b*, 20*c* of a target material, and the light intensity of the scattered light 20 detected by the optical detection component 12 decreases as attenuation of the scattered light 20 increases.

Figure 3:
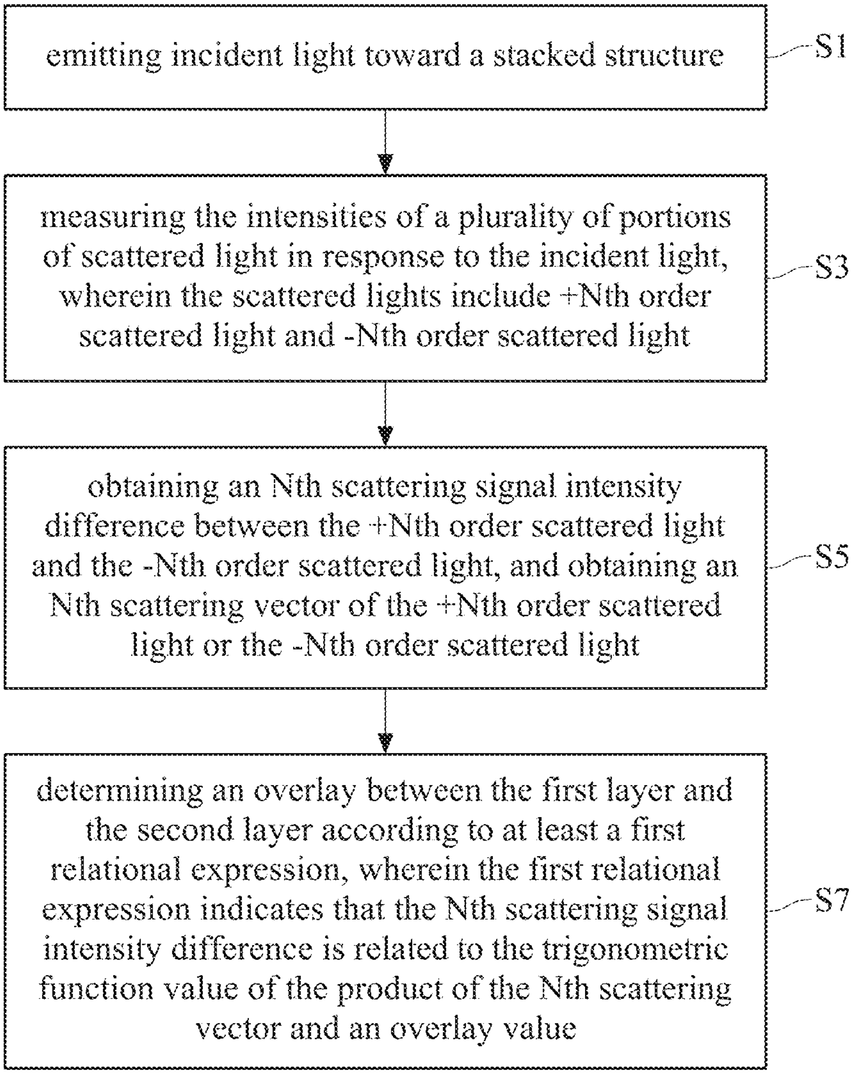
FIG. 3 is a flow chart of an overlay measurement method according to an embodiment of the present disclosure.

To further describe the above overlay measurement method, please refer to FIG. 3, which is a flow chart of an overlay measurement method according to an embodiment of the present disclosure. As shown in FIG. 3, the overlay measurement method includes step S1: emitting incident light toward a stacked structure including a first layer and a second layer; step S3: measuring the intensities of a plurality of portions of scattered light in response to the incident light, wherein the scattered light include +Nth order scattered light and −Nth order scattered light, and N is a natural number; step S5: obtaining an Nth scattering signal intensity difference between the +Nth order scattered light and the −Nth order scattered light, and obtaining an Nth scattering vector of the +Nth order scattered light or the −Nth order scattered light; and step S7: determining an overlay between the first layer and the second layer according to at least a first relational expression, wherein the first relational expression indicates that the Nth scattering signal intensity difference is related to the trigonometric function value of the product of the Nth scattering vector and an overlay value.

Figure 4:
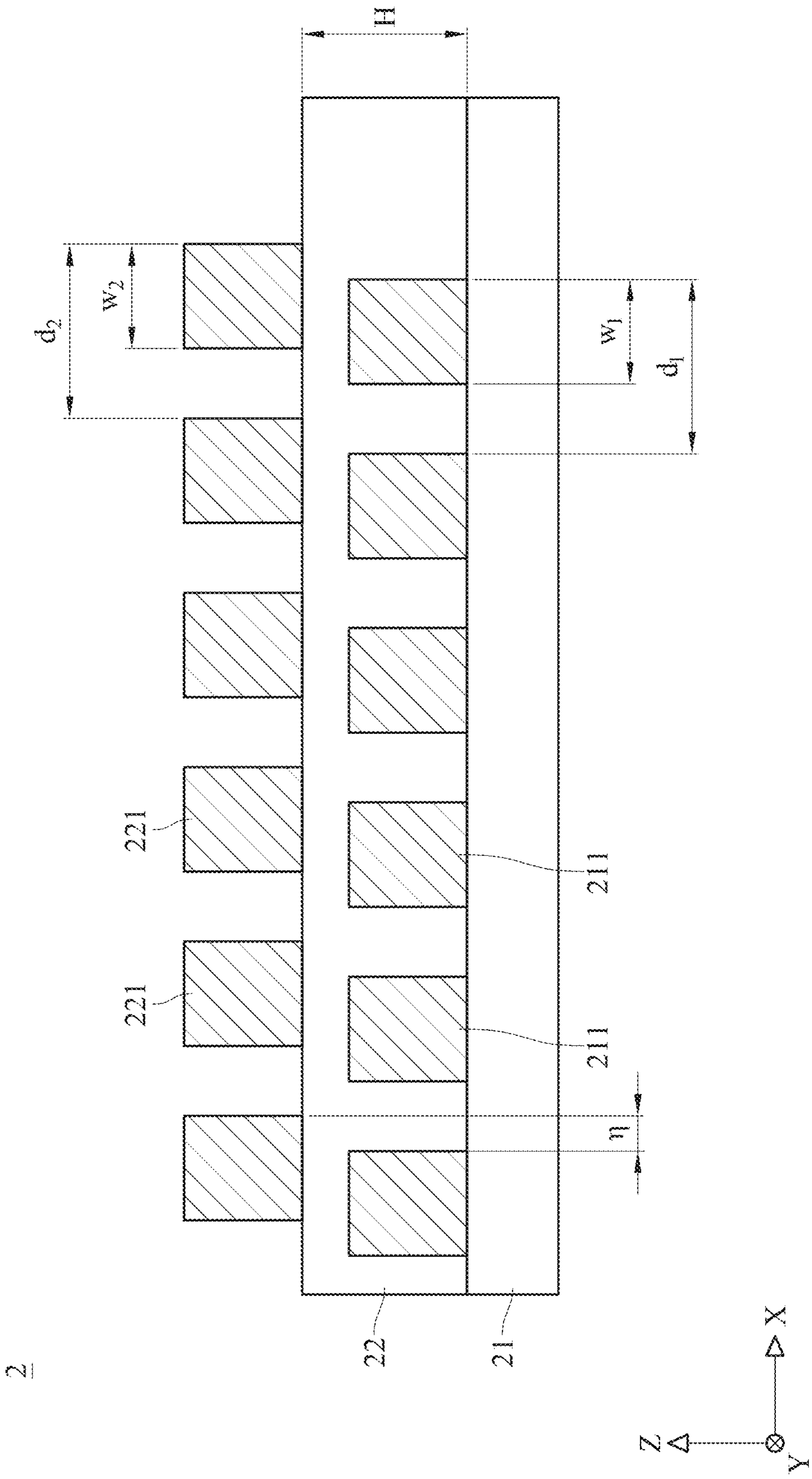
FIG. 4 is a schematic cross-sectional view of a stacked structure applicable for the overlay measurement system and method according to an embodiment of the present disclosure.

Please refer to FIG. 4 which is a schematic cross-sectional view of a stacked structure applicable for the overlay measurement system and method according to an embodiment of the present disclosure. As shown in FIG. 4, the stacked structure 2 may include a first layer 21 and a second layer 22 stacked along the stacking direction (e.g. the Z direction), wherein a plurality of first units 211 are periodically arranged along the arrangement direction (e.g. the X direction) on the first layer 21, a plurality of second units 221 are periodically arranged along the arrangement direction (e.g. the X direction) on the second layer 22, and the first units 211 on the first layer 21 and the second units 221 on the second layer 22 have an overlay value $\eta$ of relative misalignment. FIG. 4 exemplarily shows that the arrangement directions of the plurality of first units 211 and the plurality of second units 221 are consistent, but the present disclosure is not limited thereto. For example, in other embodiments, there may be an included angle between the respective arrangement directions of the plurality of first units 211 and the plurality of second units 221. It should be noted that FIG. 4 exemplarily shows that the first layer 21 and the second layer 22 are adjacent, but the present disclosure is not limited thereto. That is, the stacked structure 2 may further include an intermediate layer located between the first layer 21 and the second layer 22. That is, the overlay measurement system and method of one or more embodiments of the present disclosure may be applied to adjacent layers or cross layers of a stacked structure. In addition, the stacking direction of the first layer 21 and the second layer 22 is not parallel to the arrangement direction of the first units 211 and the second units 221. In particular, the stacking direction may be perpendicular to the arrangement direction (for example, Z direction is perpendicular to X direction).

The overlay measurement method of FIG. 3 is illustrated below by taking the overlay measurement system 1 of FIG. 1 and the stack structure 2 of FIG. 4 as an example. In step S1, when the X-ray light source 11 emits incident light 110 toward the stacked structure 2, scattered light 20 is generated. Step S1 is equivalent to the aforementioned step of using the X-ray light source 11 to emit incident light 20 toward the stacked structure 2 with the first layer 21 and the second layer 22 in contact. In step S3, the optical detection component 12 may measure the intensity of scattered light in response to the incident light 110. The scattered light 20 may include +Nth order scattered light and −Nth order scattered light, wherein N is a natural number. In addition to the +Nth order scattered light and the −Nth order scattered light, the scattered light 20 may further include other orders of light, such as 0th order scattered light, +1st order scattered light, −1st order scattered light, +2nd order scattered light, −2nd order scattered light, etc. Spatially, the +Nth order scattered light and the −Nth order scattered light may be distributed symmetrically relative to the 0th order scattered light. The intensity distribution of these scattered light 20 reflects the structural parameters of the stacked structure 2 and is particularly related to the overlay value $\eta$. Step S3 is equivalent to the aforementioned step of using the optical detection component 12 to detect the scattered light 20 of the first layer 21 and the second layer 22.

In step S5, the computing device 13 may obtain an Nth scattering signal intensity difference between the +Nth order scattered light and the −Nth order scattered light, and obtain an Nth scattering vector of the Nth order scattered light or the −Nth order scattered light. For example, the computing device 13 may determine the corresponding order (N) according to the scattering angle (direction) of each scattered light, wherein the information on the scattering angle (direction) of the scattered light corresponds to different sensing positions on the measurement plane of the optical detection component 12. Accordingly, the computing device 13 may perform subtraction on the signal intensities of the +Nth order scattered light and the −Nth order scattered light to obtain the Nth scattering signal intensity difference. Furthermore, the computing device 13 may determine the scattering vector of each order of scattered light (for example, the Nth scattering vector of the +Nth order scattered light) according to the wavelength of the incident light and the scattering angle of each scattered light.

For example, the Nth scattering vector may have three components qx, qy, and qz. The magnitude of the Nth scattering vector is inversely proportional to the wavelength of the incident light, and each component qx, qy, qz is respectively related to a plurality of angle parameters of the scattering process (for example, incident angle, scattering angle, etc.). That is, the computing device 13 may calculate the Nth scattering vector of each scattered light (such as +Nth order scattered light, −Nth order scattered light) according to various angle parameters of the scattering process and the wavelength of the incident light. In step S7, the computing device 13 may determine an overlay between the first layer 21 and the second layer 22 according to at least a first relational expression, wherein the first relational expression indicates that the Nth scattering signal intensity difference (ΔI) is related to the trigonometric function value of the product of the Nth scattering vector (qx) and an overlay value (η). For example, please refer to the following relational expression (1).

$$\Delta I \propto \mathrm{Sin}(qx \times \eta) \quad \text{relational expression (1)}$$

It can be seen from the relational expression (1) that the Nth scattering signal intensity difference (ΔI) is proportional to the sine value of the product of the Nth scattering vector (qx) and an overlay value (η). In other words, the Nth scattering signal intensity difference (ΔI) may have periodic changes as the overlay value (η) increases, and when the overlay value (η) between the two layers is zero, the Nth scattering signal intensity difference (ΔI) between the +Nth order scattered light and the −Nth order scattered light is zero. Therefore, through the relational expression (1), the computing device 13 may determine the overlay between the two layers according to the Nth scattering signal intensity difference (ΔI) and the Nth scattering vector (qx). Steps S5, S7 include the aforementioned step of using the computing device 13 to measure light intensity of the scattered light 20 according to a target material light intensity distribution diagram, calculating the difference between a plurality of positive and negative order light intensities in the scattered light 20 according to the intensities of the plurality of positive and negative order light contained in the scattered light 20, and determining the presence of an overlay between the first layer and the second layer based on an overlay parameter.

Figure 5:
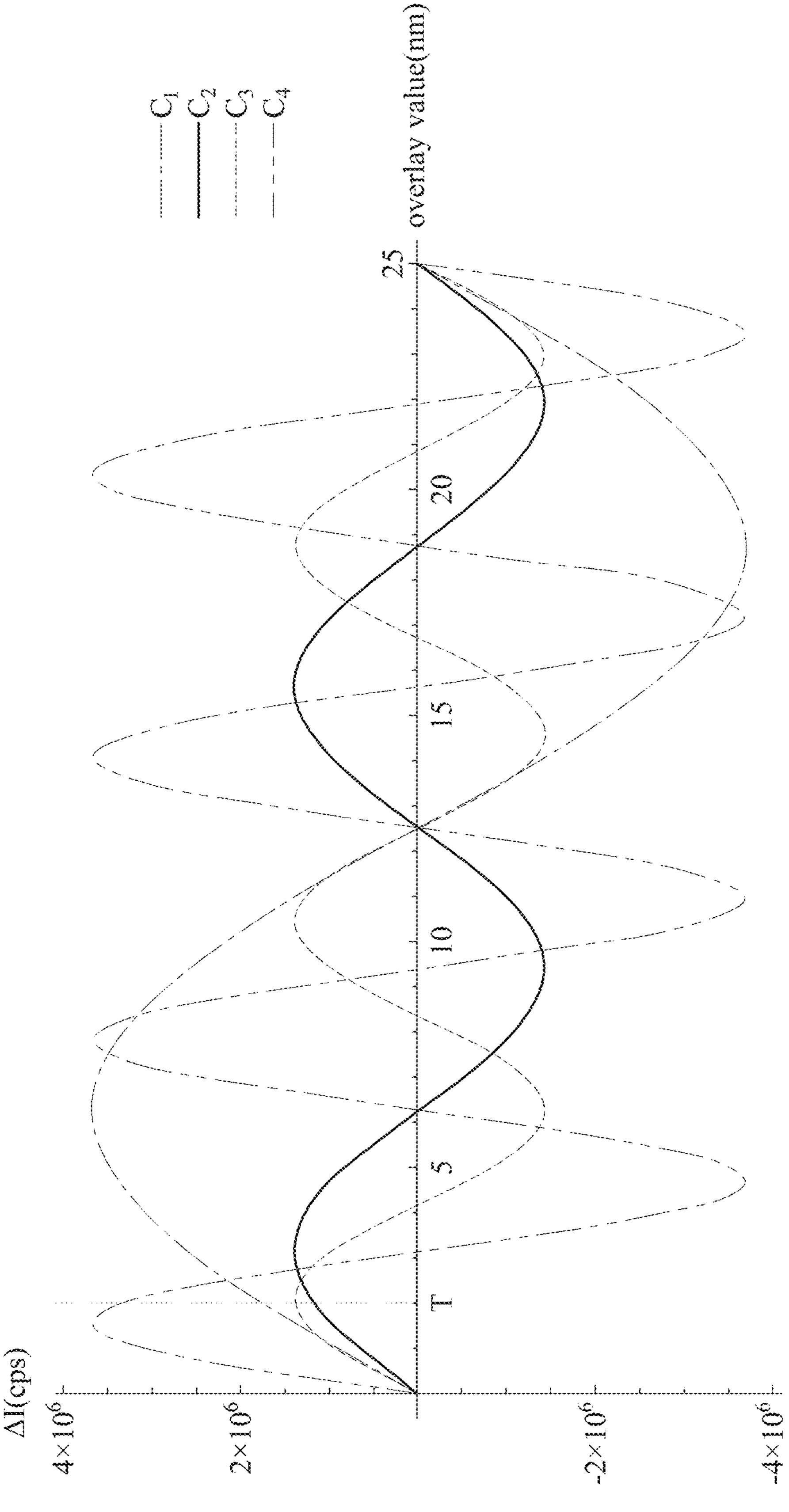
FIG. 5 is a graph showing the relationship between the scattering signal intensity difference and the overlay value of the multi-order scattered light of an overlay measurement method according to an embodiment of the present invention.

Please refer to FIGS. 1, 2, 4 and 5, wherein FIG. 5 is a graph showing the relationship between the scattering signal intensity difference and the overlay value of the multi-order scattered light of an overlay measurement method according to an embodiment of the present invention. As shown in FIG. 5, data $C_1$ represents a first scattering signal intensity difference, data $C_2$ represents a second scattering signal intensity difference, data $C_3$ represents a third scattering signal intensity difference, and data $C_4$ represents a fourth scattering signal intensity difference. In the present embodiment, a spacing of arrangement of the first layer and the second layer is, for example, 25 nm. As the scattering vectors corresponding to the scattered light of different orders are different, the period of the variation relationship between the intensity difference of the scattered signals of different orders and the overlay value is also different. For example, the variation period of the first scattering signal intensity difference that changes with the overlay value may be 25 nm, and the variation period of the Nth order scattering signal intensity difference that changes with the overlay value may be 25/N nm. Furthermore, the first relational expression used in the aforementioned step S7 may be the following relational expression (2).

$$\Delta I = Const \times \mathrm{Sin}(qx \times \eta) \quad \text{relational expression (2)}$$

The relationship curve shown in FIG. 5 may be obtained by using the relationship expression (2), wherein “Const” represents a proportionality constant between the Nth scattering signal intensity difference (ΔI) and the sine value of the product of the Nth scattering vector (qx) and the overlay value (η). For example, the computing device 13 may input experimental-related parameters (for example, optical parameters of the X-ray source, structural parameters of the stacked structure, etc.) into a simulation software to determine the proportionality constant (Const) and obtain a complete sine function. Thereby, the computing device 13 may directly obtain the overlay value (η) between the two layers based on the measured Nth scattering signal intensity difference (ΔI).

In another implementation, for a specific manufacturing process, the computing device 13 may also collect a plurality of pieces of historical data of the Nth scattering signal intensity difference (ΔI) and the overlay value (η) between the two layers in advance, and simulate the relationship curve shown in FIG. 4 based on these historical data. Or, according to relational expression (2), for a structure with a spacing of arrangement of two layers of 25 nm, the maximum value of the first scattering signal intensity difference (ΔI) may occur at an overlay value of 6.25 nm. Therefore, during experiment, the overlay value of the test sample may be first arranged to be 6.25 nm, and the first scattering signal intensity difference (ΔI) is measured to determine the proportionality constant (Const), and then the complete relational expression (2) may be obtained.

Furthermore, in addition to the first relational expression, in step S7, the computing device 13 may further determine the overlay between the two layers according to a predetermined error range T. Taking data $C_1$ as an example, when the first scattering signal intensity difference is $2 \times 10^6$, the corresponding overlay value (η) may be about 2 nm or 10 nm. However, since the overlay value (n) should be smaller than the predetermined error range T (3 nm), the computing device 13 may determine that the overlay value (n) is 2 nm. In the present embodiment, the predetermined error range T may be related to a spacing between a plurality of first units arranged in the first layer and a spacing between a plurality of second units arranged in the second layer. Specifically, when the first spacing of the plurality of first units is equal to the second spacing of the plurality of second units, the predetermined error range T may be at least smaller than the first spacing and the second spacing.

Figure 6:
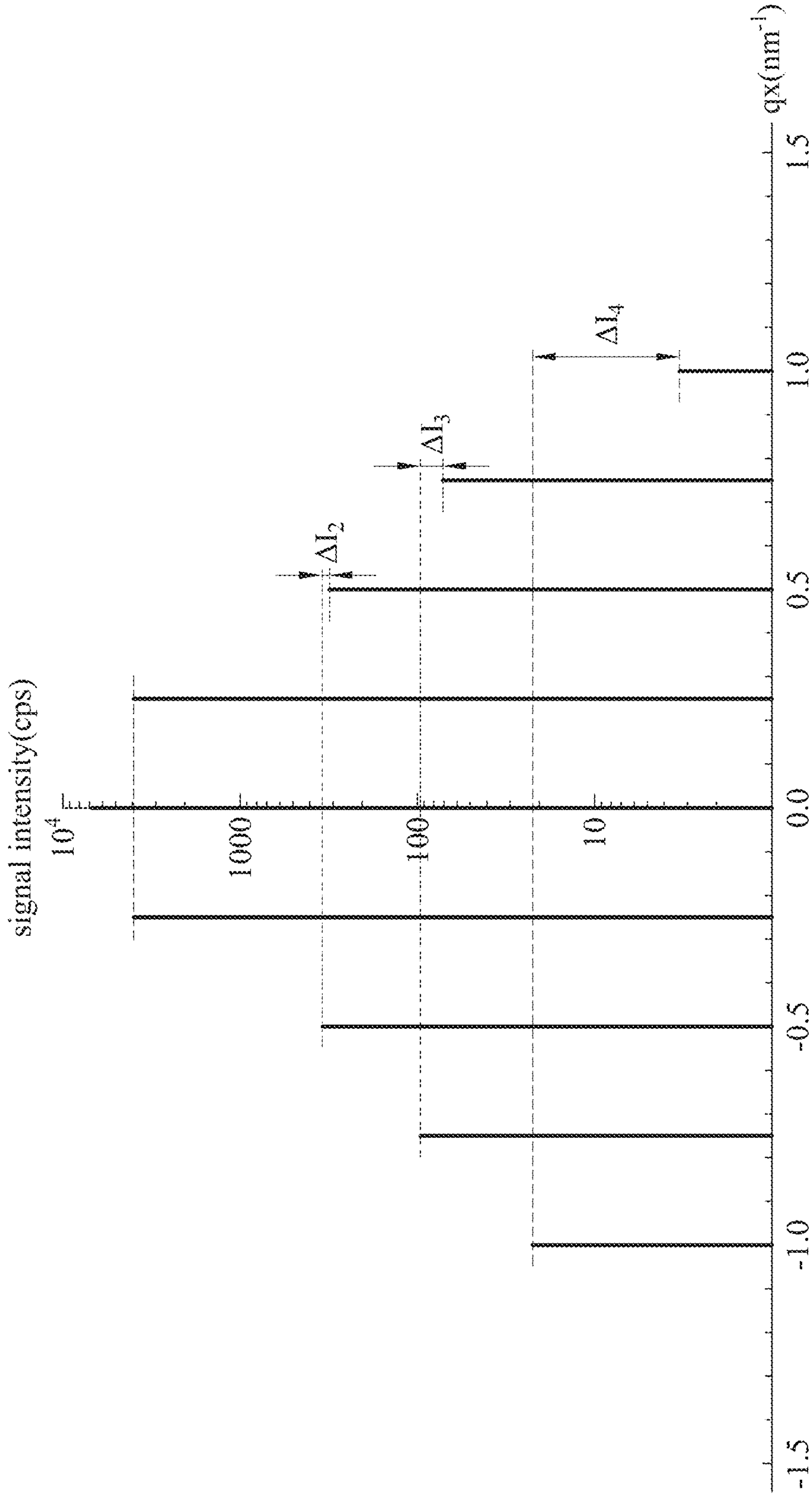
FIG. 6 shows a scattering signal intensity graph of multi-order scattered light under a specific overlay condition.

In addition, it can be seen from FIG. 5 that for higher-order scattered light, the change rate of the Nth scattering signal intensity difference relative to the overlay value may be more significant. Please refer to FIG. 6 which shows a scattering signal intensity graph of multi-order scattered light under a specific overlay condition. In FIG. 6, the signal where the scattering vector qx is 0 corresponds to the 0th order scattered light, the signal where the scattering vector qx is 0.25 corresponds to the +1st order scattered light, the signal where the scattering vector qx is 0.5 corresponds to the +2nd order scattered light, the signal where the scattering vector qx is 0.75 corresponds to the +3rd order scattered light, the signal where the scattering vector qx is 1 corresponds to the +4th order scattered light. The same goes for the −Nth order scattered light. As shown in FIG. 6, under this specific overlay condition, the first scattering signal intensity difference is less significant, and the fourth scattering signal intensity difference $\Delta I_4$ is greater than the first scattering signal intensity difference $\Delta I_1$, the second scattering signal intensity difference $\Delta I_2$ and the third scattering signal intensity difference $\Delta I_3$. Therefore, the overlay measurement method of the present disclosure is not limited to using the first scattering signal intensity difference between the +1st order scattered light and the −1st order scattered light to determine the overlay of the stacked structure, higher Nth scattering signal intensity difference may also be used to determine the overlay with higher accuracy.

Figure 7:
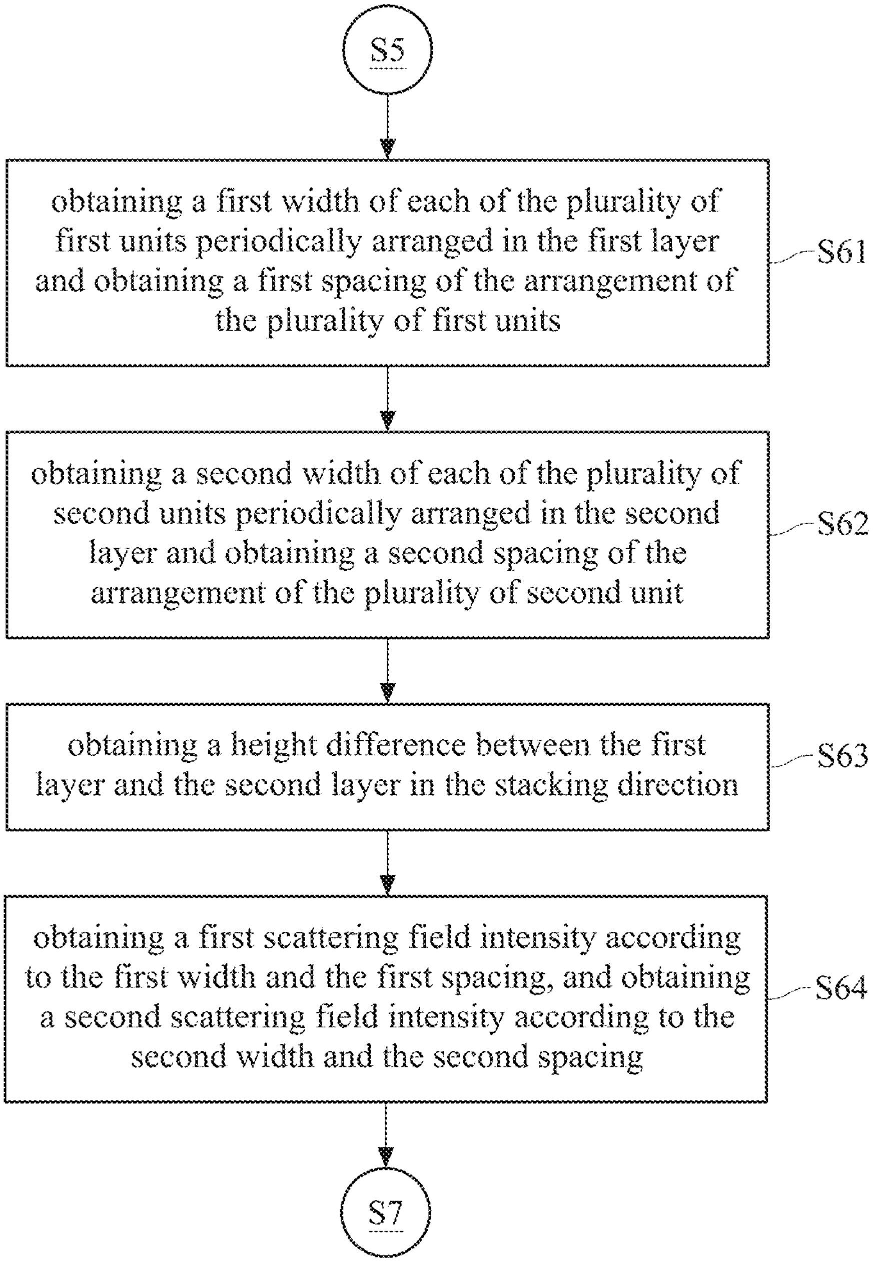
FIG. 7 is a flow chart of an overlay measurement method according to another embodiment of the present disclosure.

Please refer to FIG. 7 along with FIG. 3, FIG. 7 is a flow chart of an overlay measurement method according to another embodiment of the present disclosure. In this embodiment, in addition to steps S1 to S7 shown in FIG. 3, the overlay measurement method may further include, between steps S5 and S7, step S61: obtaining a first width of each of the plurality of first units periodically arranged in the first layer, and obtaining a first spacing of the arrangement of the plurality of first units, wherein the arrangement direction of the plurality of first units is not parallel to the stacking direction of the first layer and the second layer; step S62: obtaining a second width of each of the plurality of second units periodically arranged in the second layer, and obtaining a second spacing of the arrangement of the plurality of second units, wherein the arrangement direction of the plurality of second units is not parallel to the stacking direction of the first layer and the second layer; step S63: obtaining a height difference between the first layer and the second layer in the stacking direction; and step S64: obtaining a first scattering field intensity according to the first width and the first spacing, and obtaining a second scattering field intensity according to the second width and the second spacing. In this embodiment, the relational expression (1) further indicates that the Nth scattering signal intensity difference is related to the first scattering field intensity (F1), the second scattering field intensity (F2) and the height difference (H). The first scattering field intensity (F1), the second scattering field intensity (F2), and the height difference (H) will be elaborated on in detail in due course.

The overlay measurement method of FIG. 7 is illustrated below by taking the overlay measurement system 1 of FIG. 1 and the stack structure 2 of FIG. 4 as an example. In step S61, the computing device may obtain the first width $w_1$ of each of the plurality of first units 211 periodically arranged along an arrangement direction (e.g. X direction) in the first layer 21, and the first spacing $d_1$ of the arrangement of the plurality of first units 211. In step S62, the computing device may obtain the second width $w_2$ of each of the plurality of second units 221 periodically arranged along an arrangement direction (e.g. X direction) in the second layer 22, and the second spacing $d_2$ of the arrangement of the plurality of second units 221. Specifically, the computing device may obtain the structural information described above based on parameters input by the user; or the computing device may automatically measure critical structural parameters after loading the design drawing of the stacked structure. In addition, before the first layer 21 and the second layer 22 are stacked, the structural parameters (width and spacing) of a single layer may also be individually measured through experiments and stored in the computing device. In step S63, the computing device may obtain the height difference H between the first layer 21 and the second layer 22 in the stacking direction (e.g. Z direction). In step S64, the computing device 13 may obtain a first scattering field intensity based on the first width $w_1$ and the first spacing $d_1$, and obtain a second scattering field intensity based on the second width $w_2$ and the second spacing $d_2$. Please refer to the following relational expression (3).

relational expression (3)

$$1(qx) \propto |F(qx)|^2 = \sum_{k=0}^{m} \delta\left(qx - \frac{2k\pi}{L}\right) * \left| \int \rho(x)\exp(-iqx)dx \right|^2$$

In the relational expression (3), "I" is the scattered light intensity, "qx" is the scattering vector, "F" is the scattering field intensity, "L" is the arrangement spacing of the stacked structure, and "p" is the electron density function of the repeating unit of the stacked structure. Through the relational expression (3), the scattering field intensity (F1 and F2) of the first layer and the second layer may be obtained respectively according to the respective structures of the first layer and the second layer. The theoretical basis of the above relational expression (3) is based on the Convolution theorem, in which the scattering intensity distribution may be obtained by Fourier transforming the spatial function of the material that generates scattering. Specifically, the summation term (Σ) of the relational expression (3) may correspond to the structure factor of the stacked structure (ie, the first spacing $d_1$ and the second spacing $d_2$ of arrangement), and the integral term (∫) may correspond to the shape factor of the stacked structure (ie, the first width $w_1$, the second width $w_2$). That is, in steps S61 to S64, the computing device may obtain these structure factors and shape factors of the stacked structure to calculate the first scattering intensity and the second scattering intensity.

According to the relational expression (3), the scattering field intensities of the two layers of the stacked structure may be added together, and the resulting scattered light intensity has an interference term. Please refer to the relational expressions (4) and (5).

$$I(qx) \propto F1(qx)^2 + F2(qx)^2 + 2F1(qx)F2(qx)\mathrm{Cos}(qx \times \eta + qz \times H) \quad \text{relational expression (4)}$$

$$\Delta I = I^{+m} - I^{-m} \propto -4F1(qx)F2(qx)\mathrm{Sin}(qx \times \eta)\mathrm{Sin}(qz \times H) \quad \text{relational expression (5)}$$

In one embodiment, the relational expression (2) or (5) may be simplified to the relational expression (1), or the relational expression (1) may further indicate that the Nth scattering signal intensity difference (ΔI) is further related to the first scattering field intensity (F1), second scattering field intensity (F2) and height difference (H). As described above, qz is another scattering vector perpendicular to the Nth scattering vector qx. That is, in step S7, the computing device may add the first scattering field intensity and the second scattering field intensity obtained in step S64 (relational expression (4)), and then perform subtraction on the signals of the positive and negative orders (relational expression (5)) to obtain the relational expression (5) (or relational expression (1)).

Accordingly, the method of determining the overlay based on the intensity difference of an Nth scattering signal of one of the multi-order scattered light has been described above. In the present disclosure, a plurality of Nth scattering signal intensity differences of the multi-order scattered light may also be used to determine the overlay. For example, the computing device 13 may simultaneously determine the overlay of the stacked structures based on the first scattering signal intensity difference, the second scattering signal intensity difference and the respective scattering vectors. Specifically, as shown in FIG. 5, the relational expression (1) may indicate the relationship between the first scattering signal intensity difference and the overlay value (data $C_1$), and indicate the relationship between the second scattering signal intensity difference and the overlay value (data $C_2$). The computing device 13 may perform fitting according to the scattering intensity data of multi-order scattered light to improve the accuracy of overlay measurement.

Figure 8:
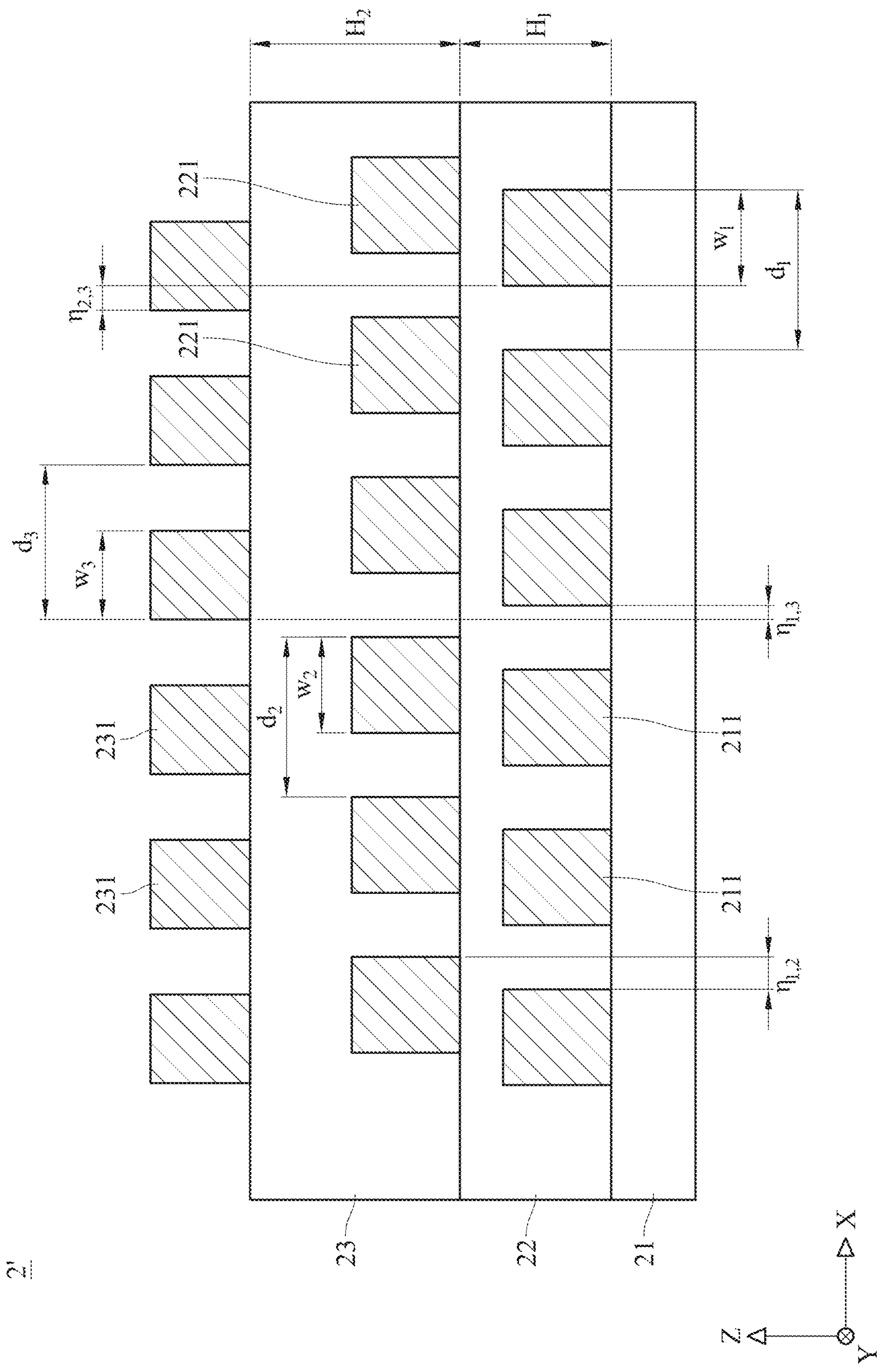
FIG. 8 is a schematic cross-sectional view of a stacked structure including a plurality of layers applicable for the overlay measurement system and method according to another embodiment of the present disclosure.

In addition, the overlay measurement method and system of the present disclosure may also be applied to measuring overlay of stacked structures with multiple layers, and may be applicable to situations where there are multiple intermediate layers between specified layers to be measured. Please refer to FIG. 8 which is a schematic cross-sectional view of a stacked structure including a plurality of layers applicable for the overlay measurement system and method according to another embodiment of the present disclosure. As shown in FIG. 8, the stacked structure 2' of the present embodiment includes a first layer 21, a second layer 22 and a third layer 23. There is a height difference $H_1$ between the first layer 21 and the second layer 22 in the stacking direction (e.g. Z direction), and there is a height difference $H_2$ between the second layer 22 and the third layer 23 in the stacking direction (e.g. Z direction). The first layer 21 is provided with first units 211 that are periodically arranged along an arrangement direction (e.g. X direction). The first units 211 have a first width $w_1$, and there is a first spacing $d_1$ between the plurality of first units 211. The second layer 22 is provided with second units 221 that are periodically arranged along an arrangement direction (e.g. X direction). The second units 221 have a second width $w_2$, and there is a second spacing $d_2$ between the plurality of second units 221. The third layer 23 is provided with third units 231 that are periodically arranged along an arrangement direction (e.g. X direction). The third units 231 have a third width $w_3$, and there is a third spacing $d_3$ between the plurality of third units 231. FIG. 8 exemplarily shows that the arrangement directions of the plurality of first units 211, the plurality of second units 221 and the plurality of third units 231 are consistent, but the present disclosure is not limited thereto. For example, in other embodiments, there may be an included angle between the respective arrangement directions of the plurality of first units 211, the plurality of second units 221 and the plurality of third units 231. In addition, the stacking direction of the first layer 21, the second layer 22 and the third layer 23 is not parallel to the arrangement direction of the first units 211, the second units 221 and the third units 231. Specifically, the stacking direction may be perpendicular to the arrangement direction (e.g. Z direction is perpendicular to the X direction).

According to an embodiment, in this architecture, taking the transmission X-ray scattering technology as an example, the X-ray light source 11 is configured for measuring the stacked structure 2 composed of the first layer 21 and the second layer 22 stacked above and below. When the X-ray light source 11 emits an incident light 110 toward the stacked structure 2, the incident light is scattered into scattered light 20 by transmitting the stacked structure 2. The optical detection component 12 detects the scattered light 20 transmitting the stacked structure 2. The computing device 13 executes an open source research software, such as BornAgain. The BornAgain is used to simulate and fit reflectivity tests of neutrons and X-rays as well as low-incidence small-angle scattered light of X-rays and neutrons. BornAgain may establish mathematical models and measure overlay values based on the above relational expressions (1)-(5). If the overlay value $\eta_{1,2}$ generated by BornAgain based on these scattered light 20 is not 0, it means that the first units 211 in the first layer 21 and the second units 221 in the second layer 22 are not aligned along the stacking direction, and this structure has a structural overlay. On the other hand, if the overlay value $\eta_{1,2}$ generated by BornAgain based on these scattered light 20 is 0, it means that the first units 211 in the first layer 21 and the second units 221 in the second layer 22 are aligned along the stacking direction.

According to an embodiment, in this architecture, the transmission X-ray scattering technology is used to measure the stacked structure 2' having three layers, wherein the three layers are the first layer 21, the second layer 22 and the third layer 23 stacked along the stacking direction in sequence. The difference between this embodiment and the previous embodiment is that the stacked structure 2' has three layers, and the X-ray light source 11, the optical detection component 12, the computing device 13 and the open source research software are all the same. The following describes an example of using BornAgain to measure the stacked structure 2' of three layers.

When BornAgain generates an overlay value $\eta_{1,3}$ that is not 0 based on scattered light that transmit the stacked structure 2', it means that a first unit 211 of the first layer 21 and a second unit 221 of the second layer 22 are not aligned, or another second unit 221 of the second layer 22 and a third unit 231 of the third layer 23 are not aligned, wherein the two second units may be different. Next, BornAgain formulates the simultaneous equations of the scattering signal intensity difference between the two scattering signals of positive and negative order scattered light based on the relational expression (5), thereby generating the overlay value $\eta_{1,2}$ and the overlay value $\eta_{2,3}$. The simultaneous equation may be related to the scattering signal intensity difference between the +1/−1 order scattering signal, and the scattering signal intensity difference between the +2/−2 order scattering signal. Alternatively, the simultaneous equation may be related to the scattering signal intensity difference between the +3/−3 order scattering signal, and the scattering signal intensity difference between the +7/−7 order scattering signal. This is because BornAgain extracts two stronger positive and negative order scattering signals from scattered light.

In addition, for any two different layers in the stacked structure, different spacing ($d_1$, $d_2$, $d_3$) and width ($w_1$, $w_2$, $w_3$) of the first unit 211, the second unit 221 and the third unit 231 may cause different scattered light. Also, different height of different layers ($H_1$, $H_2$, $H_1+H_2$) may cause different scattered light. Therefore, BornAgain may generate the values of the first scattering field intensity (F1), the second scattering field intensity (F2) and the height difference (H) in the relational expression (5) based on these structural parameters.

According to an embodiment, in this architecture, there is an overlay value $\eta_{1,2}$ between the first unit 211 of the first layer 21 and the second unit 221 of the second layer 22, there is an overlay value $\eta_{2,3}$ between the second unit 221 of the second layer 22 and the third unit 231 of the third layer 23, and there is an overlay value $\eta_{1,3}$ between the first unit 211 of the first layer 21 and the third unit 231 of the third layer 23. Therefore, when incident light transmits the stacked structure 2', scattered light may be generated between each layer, and the scattered signal intensity differences corresponding to these scattered light may reflect the overlay value between each two layers.

In the present embodiment, although the scattering signal intensity difference of the scattered light generated by each layer and the overlay value have a trigonometric relationship as described in relational expression (1), due to structural differences between different layers, the proportionality constant in relational expression (2) may differ. Specifically, for any two different layers in the stacked structure, different spacing ($d_1$, $d_2$, $d_3$) and width ($w_1$, $w_2$, $w_3$) of the first unit 211, the second unit 221 and the third unit 231 may cause different scattered light. Also, different height of different layers ($H_1$, $H_2$, $H_1+H_2$) may cause different scattered light. For example, the +1st order scattered light and −1st order scattered light generated by the first unit 211 with a width $w_1$=10 nm may be distinguished from the +1st order scattered light and −1st order scattered light generated by the first unit 211 with a width $w_1$=15 nm. Therefore, the computing device 13 may establish the proportionality constant in relational expression (2) based on these structural parameters.

The following are the simulation results of aluminum (Al) target material and indium (In) target material with an overlay of 0.2 nm.

| Order | +$N^{th}$ order intensity (cps) | | −$N^{th}$ order intensity (cps) | | Intensity difference between +/− $N^{th}$ order (cps) | |
|---|---|---|---|---|---|---|
| (N) | Al | In | Al | In | Al | In |
| 1 | 4008 | $3.57 \times 10^8$ | 4042 | $3.57 \times 10^8$ | 34 | $1.85 \times 10^5$ |
| 2 | 326 | $3.4 \times 10^7$ | 350 | $3.41 \times 10^7$ | 23.8 | $1.41 \times 10^5$ |
| 3 | 74 | $1.5 \times 10^7$ | 98.4 | $1.52 \times 10^7$ | 24.5 | $2.11 \times 10^5$ |
| 4 | 3.4 | $2.16 \times 10^7$ | 22.8 | $2.23 \times 10^7$ | 19.5 | $7.32 \times 10^5$ |

The following are the simulation results of indium target material under different overlays (0.2-1 nm).

| Order | +$N^{th}$ order intensity (cps) Overlay (nm) | | | −$N^{th}$ order intensity (cps) Overlay (nm) | | |
|---|---|---|---|---|---|---|
| (N) | 0.2 | 0.5 | 1 | 0.2 | 0.5 | 1 |
| 1 | $3.57 \times 10^8$ | $3.56 \times 10^8$ | $3.51 \times 10^8$ | $3.57 \times 10^8$ | $3.56 \times 10^8$ | $3.52 \times 10^8$ |
| 2 | $3.4 \times 10^7$ | $3.34 \times 10^7$ | $3.17 \times 10^7$ | $3.38 \times 10^7$ | $3.38 \times 10^7$ | $3.24 \times 10^7$ |
| 3 | $1.5 \times 10^7$ | $1.44 \times 10^7$ | $1.26 \times 10^7$ | $1.49 \times 10^7$ | $1.49 \times 10^7$ | $1.36 \times 10^7$ |
| 4 | $2.16 \times 10^7$ | $2 \times 10^7$ | $1.55 \times 10^7$ | $2.17 \times 10^7$ | $2.17 \times 10^7$ | $1.86 \times 10^7$ |

| Order (N) | Intensity difference between +/− $N^{th}$ order (absolute value) (cps) Overlay (nm) 0.2 | 0.5 | 1 |
|---|---|---|---|
| 1 | $1.85 \times 10^5$ | $4.61 \times 10^5$ | $9.16 \times 10^5$ |
| 2 | $1.41 \times 10^5$ | $3.5 \times 10^5$ | $6.77 \times 10^5$ |
| 3 | $2.11 \times 10^5$ | $5.17 \times 10^5$ | $9.61 \times 10^5$ |
| 4 | $7.32 \times 10^5$ | $1.77 \times 10^6$ | $3.09 \times 10^6$ |

In view of the above description, the method and system of measuring the structural overlay based on scattering the X-ray of the present disclosure uses the overlay parameter and the difference between the positive and negative order light intensities in the scattered light generated by scattering the incident light through a plurality of layers of the stacked structure to determine the presence of overlay between the layers, thereby providing a high-precision overlay measurement scheme. In addition, the method and system of measuring the structural overlay based on scattering the X-ray of the present disclosure uses the scattering vector and the signal intensity difference between the +Nth order scattered light and the −Nth order scattered light among the scattered light generated by scattering the incident light through a plurality of layers of the stacked structure to determine the overlay between different layers. Accordingly, the present disclosure may provide a high-precision overlay measurement scheme, especially for fine nanoscale three-dimensional structures. The method and system of measuring the structural overlay based on scattering the X-ray of the present disclosure may not need the specific stacking state of the stacked structure in advance to perform overlay measurement, instead, this method and system may be directly applied for in-die measurement operations. Furthermore, the present disclosure uses X-ray light source with high transmission characteristic for measurement, and may be effectively applied to cutting-edge materials used in advanced manufacturing processes, such as germanium (Ge), bismuth (Bi) and other metal materials. In addition, the overlay measurement method and system of the present disclosure may also further improve the overlay measurement accuracy by fitting multi-order scattering signals.

What is claimed is:

1. A method for measuring structural overlay using X-ray scattering, comprising:

emitting an incident light from an X-ray light source toward a stacked structure with a first and second layer in contact;

detecting scattered light from the first layer and the second layer using an optical detection component; and measuring, using a computing device, light intensity of the scattered light according to a target material light intensity distribution diagram, calculating a difference between a plurality of positive and negative order light intensities in the scattered light according to the plurality of positive and negative order light intensities contained in the scattered light, and determining presence of an overlay between the first layer and the second layer based on an overlay parameter, wherein the first layer and the second layer is determined to be aligned with each other when the computing device determines that there is no overlay, the first layer and the second layer is determined to be not aligned with each other when the computing device determines that the overlay exists, and the target material light intensity distribution diagram comprises a plurality of positive and negative order scattered light intensities of a target material, and the light intensity of the scattered light detected by the optical detection component decreases as attenuation of the scattered light increases, wherein the plurality of positive and negative order light intensities contained in the scattered light correspond to +Nth order scattered light and −Nth order scattered light, and N is a natural number, and the step of calculating the difference between the plurality of positive and negative order light intensities in the scattered light comprises:

obtaining an Nth scattering signal intensity difference between the +Nth order scattered light and the −Nth order scattered light, and obtaining an Nth scattering vector of the +Nth order scattered light or the −Nth order scattered light; and determining the overlay between the first layer and the second layer according to at least a first relational expression, wherein the first relational expression indicates that the Nth scattering signal intensity difference is related to a trigonometric function value of a product of the Nth scattering vector and an overlay value.

2. The method for measuring structural overlay using X-ray scattering of claim 1, wherein the step of calculating the difference between the plurality of positive and negative order light intensities in the scattered light further comprises:

obtaining a first width of each of a plurality of first units periodically arranged in the first layer, and obtaining a first spacing of arrangement of the plurality of first units, wherein an arrangement direction of the plurality of first units is not parallel to a stacking direction of the first layer and the second layer;

obtaining a second width of each of a plurality of second units periodically arranged in the second layer, and obtaining a second spacing of arrangement of the plurality of second units, wherein an arrangement direction of the plurality of second units is not parallel to the stacking direction;

obtaining a height difference between the first layer and the second layer in the stacking direction;

obtaining a first scattering field intensity according to the first width and the first spacing; and obtaining a second scattering field intensity according to the second width and the second spacing, wherein the first relational expression further indicates that the Nth scattering signal intensity difference is further related to the first scattering field intensity, the second scattering field intensity and the height difference.

3. The method for measuring structural overlay using X-ray scattering of claim 1, wherein the first relational expression is: $\Delta I \propto \mathrm{Sin}(qx \times \eta)$, wherein $\Delta I$ is the Nth scattering signal intensity difference, qx is the Nth scattering vector, $\eta$ is the overlay value, qz is another scattering vector perpendicular to the Nth scattering vector.

4. The method for measuring structural overlay using X-ray scattering of claim 1, wherein a plurality of first units are periodically arranged in the first layer, a plurality of second units are periodically arranged in the second layer, and determining the overlay between the first layer and the second layer is further according to a predetermined error range, wherein the predetermined error range is related to a first spacing of arrangement of the plurality of first units on the first layer and a second spacing of arrangement of the plurality of second units on the second layer.

5. The method for measuring structural overlay using X-ray scattering of claim 1, wherein the scattered light further comprises +Mth order scattered light and −Mth order scattered light, and M is a natural number not equal to N, and the step of calculating the difference between the plurality of positive and negative order light intensities in the scattered light further comprises:

obtaining an Mth scattering signal intensity difference between the +Mth order scattered light and the −Mth order scattered light, and obtaining an Mth scattering vector of the +Mth order scattered light or the −Mth order scattered light, wherein the first relational expression further indicates that the Mth scattering signal intensity difference is further related to a trigonometric function value of a product of the Mth scattering vector and the overlay value.

6. The method for measuring structural overlay using X-ray scattering of claim 1, wherein the stacked structure further comprises a third layer, and in the step of calculating the difference between the plurality of positive and negative order light intensities in the scattered light, the scattered light further comprises +Pth order scattered light and −Pth order scattered light corresponding to the first layer, the second layer and the third layer, wherein P is a natural number, and the method of measuring the structural overlay further comprises:

obtaining a Pth scattering signal intensity difference between the +Pth order scattered light and the −Pth order scattered light, and obtaining a Pth scattering vector of the +Pth order scattered light or the −Pth order scattered light; and determining an overlay between the first layer, the second layer and the third layer according to at least a second relational expression, wherein the second relational expression indicates that the Pth scattering signal intensity difference is related to a trigonometric function value of a product of the Pth scattering vector and an overlay value.

7. The method for measuring structural overlay using X-ray scattering of claim 6, wherein the step of calculating the difference between the plurality of positive and negative order light intensities in the scattered light further comprises:

obtaining a first width of each of a plurality of first units periodically arranged in the first layer and a first spacing of arrangement of the plurality of first units, wherein an arrangement direction of the plurality of first units is not parallel to a stacking direction of the first layer, the second layer and the third layer;

obtaining a second width of each of a plurality of second units periodically arranged in the second layer and a second spacing of arrangement of the plurality of second units, wherein an arrangement direction of the plurality of second units is not parallel to the stacking direction;

obtaining a third width of each of a plurality of third units periodically arranged in the third layer and a third spacing of arrangement of the plurality of third units, wherein an arrangement direction of the plurality of third units is not parallel to the stacking direction;

obtaining height differences between the first layer, the second layer and the third layer in the stacking direction;

obtaining a first scattering field intensity according to the first width and the first spacing;

obtaining a second scattering field intensity according to the second width and the second spacing; and obtaining a third scattering field intensity according to the third width and the third spacing, wherein the second relational expression further indicates that the Pth scattering signal intensity difference is further related to the first scattering field intensity, the second scattering field intensity, the third scattering field intensity and the height differences.

8. The method for measuring structural overlay using X-ray scattering of claim 7, wherein in the step of calculating the difference between the plurality of positive and negative order light intensities in the scattered light, the +Nth order scattered light, the −Nth order scattered light, the +Pth order scattered light and the −Pth order scattered light are distinguished based on spacings and widths of the plurality of first units, the plurality of second units, and the plurality of third units.

9. The method for measuring structural overlay using X-ray scattering of claim 1, wherein the stacked structure further comprises an intermediate layer stacked between the first layer and the second layer.

10. A system for measuring structural overlay using X-ray scattering, comprising:

an X-ray light source configured to emit an incident light toward a stacked structure with a first layer and a second layer in contact;

an optical detection component configured to detect scattered light from the first layer and the second layer; and a computing device connected to the optical detection component, and configured to measure light intensity of the scattered light according to a target material light intensity distribution diagram, calculating a difference between a plurality of positive and negative order light intensities in the scattered light according to the plurality of positive and negative order light intensities contained in the scattered light; and determining presence of an overlay between the first layer and the second layer based on an overlay parameter, wherein the first layer and the second layer is determined to be aligned with each other when the computing device determines that there is no overlay, the first layer and the second layer is determined to be not aligned with each other when the computing device determines that the overlay exists, and the target material light intensity distribution diagram comprises a plurality of positive and negative order scattered light intensities of a target material, and the light intensity of the scattered light detected by the optical detection component decreases as attenuation of the scattered light increases, wherein the plurality of positive and negative order light intensities contained in the scattered light correspond to +Nth order scattered light and −Nth order scattered light, and N is a natural number, and for calculating the difference between the plurality of positive and negative order light intensities in the scattered light, the computing device is configured to:

obtain an Nth scattering signal intensity difference between the +Nth order scattered light and the −Nth order scattered light, obtain an Nth scattering vector of the +Nth order scattered light or the −Nth order scattered light, and determine the overlay between the first layer and the second layer according to at least a first relational expression, wherein the first relational expression indicates that the Nth scattering signal intensity difference is related to a trigonometric function value of a product of the Nth scattering vector and an overlay value.

11. The system for measuring structural overlay using X-ray scattering of claim 10, wherein the computing device is further configured to:

obtain a first width of each of a plurality of first units periodically arranged in the first layer, obtain a first spacing of arrangement of the plurality of first units, wherein an arrangement direction of the plurality of first units is not parallel to a stacking direction of the first layer and the second layer;

obtain a second width of each of a plurality of second units periodically arranged in the second layer, and obtain a second spacing of arrangement of the plurality of second units, wherein an arrangement direction of the plurality of second units is not parallel to the stacking direction, obtain a height difference between the first layer and the second layer in the stacking direction, obtain a first scattering field intensity according to the first width and the first spacing, and obtain a second scattering field intensity according to the second width and the second spacing, wherein the first relational expression further indicates that the Nth scattering signal intensity difference is further related to the first scattering field intensity, the second scattering field intensity and the height difference.

12. The system for measuring structural overlay using X-ray scattering of claim 11, wherein the first relational expression is: $\Delta I \propto \mathrm{Sin}(qx \times \eta)$, wherein ΔI is the Nth scattering signal intensity difference, qx is the Nth scattering vector, n is the overlay value, qz is another scattering vector perpendicular to the Nth scattering vector.

13. The system for measuring structural overlay using X-ray scattering of claim 10, wherein a plurality of first units are periodically arranged in the first layer, a plurality of second units are periodically arranged in the second layer, and the computing device is further configured to determine the overlay between the first layer and the second layer further according to a predetermined error range, wherein the predetermined error range is related to a first spacing of arrangement of the plurality of first units on the first layer and a second spacing of arrangement of the plurality of second units on the second layer.

14. The system for measuring structural overlay using X-ray scattering of claim 10, wherein the scattered light further comprises +Mth order scattered light and −Mth order scattered light, and Mis a natural number not equal to N, and the computing device is further configured to:

obtain an Mth scattering signal intensity difference between the +Mth order scattered light and the −Mth order scattered light, and obtain an Mth scattering vector of the +Mth order scattered light or the −Mth order scattered light, wherein the first relational expression further indicates that the Mth scattering signal intensity difference is further related to a trigonometric function value of a product of the Mth scattering vector and the overlay value.

15. The system for measuring structural overlay using X-ray scattering of claim 10, wherein the stacked structure further comprises a third layer, and in the step of calculating the difference between the plurality of positive and negative order light intensities in the scattered light, the scattered light further comprises +Pth order scattered light and −Pth order scattered light corresponding to the first layer, the second layer and the third layer, wherein P is a natural number, and the computing device is further configured to:

obtain a Pth scattering signal intensity difference between the +Pth order scattered light and the −Pth order scattered light, and obtain a Pth scattering vector of the +Pth order scattered light or the −Pth order scattered light, and determine an overlay between the first layer, the second layer and the third layer according to at least a second relational expression, wherein the second relational expression indicates that the Pth scattering signal intensity difference is related to a trigonometric function value of a product of the Pth scattering vector and an overlay value.

16. The system for measuring structural overlay using X-ray scattering of claim 15, wherein the computing device is further configured to:

obtain a first width of each of a plurality of first units periodically arranged in the first layer and a first spacing of arrangement of the plurality of first units, wherein an arrangement direction of the plurality of first units is not parallel to a stacking direction of the first layer, the second layer and the third layer;

obtain a second width of each of a plurality of second units periodically arranged in the second layer and a second spacing of arrangement of the plurality of second units, wherein an arrangement direction of the plurality of second units is not parallel to the stacking direction;

obtain a third width of each of a plurality of third units periodically arranged in the third layer and a third spacing of arrangement of the plurality of third units, wherein an arrangement direction of the plurality of third units is not parallel to the stacking direction;

obtain height differences between the first layer, the second layer and the third layer in the stacking direction;

obtain a first scattering field intensity according to the first width and the first spacing;

obtain a second scattering field intensity according to the second width and the second spacing; and obtain a third scattering field intensity according to the third width and the third spacing, wherein the second relational expression further indicates that the Pth scattering signal intensity difference is further related to the first scattering field intensity, the second scattering field intensity, the third scattering field intensity and the height differences.

17. The system for measuring structural overlay using X-ray scattering of claim 16, wherein the computing device is further configured to distinguish the +Nth order scattered light, the −Nth order scattered light, the +Pth order scattered light and the −Pth order scattered light based on spacings and widths of the plurality of first units, the plurality of second units, and the plurality of third units.

18. The system for measuring structural overlay using X-ray scattering of claim 10, wherein the stacked structure further comprises an intermediate layer stacked between the first layer and the second layer.

* * * * *